(12) United States Patent
Zhang et al.

(10) Patent No.: US 12,527,480 B2
(45) Date of Patent: Jan. 20, 2026

(54) METHOD, A DEVICE, AN ELECTRONIC APPARATUS AND A STORAGE MEDIUM FOR PROCESSING MULTI-MODAL PHYSIOLOGICAL SIGNALS

(71) Applicant: Hong Kong Centre for Cerebro-Cardiovasculer Health Engineering Limited, Hong Kong (CN)

(72) Inventors: Yuanting Zhang, Hong Kong (CN); Ting Xiang, Hong Kong (CN); Zijun Liu, Hong Kong (CN); Nan Ji, Hong Kong (CN)

(*) Notice: Subject to any disclaimer, the term of this patent is extended or adjusted under 35 U.S.C. 154(b) by 732 days.

(21) Appl. No.: 17/981,392

(22) Filed: Nov. 5, 2022

(65) Prior Publication Data

US 2023/0371821 A1 Nov. 23, 2023

(30) Foreign Application Priority Data

May 20, 2022 (CN) .......................... 202210556950.7

(51) Int. Cl.
*A61B 5/0205* (2006.01)
*A61B 5/00* (2006.01)
(Continued)

(52) U.S. Cl.
CPC ........ *A61B 5/0205* (2013.01); *A61B 5/02108* (2013.01); *A61B 5/02125* (2013.01);
(Continued)

(58) Field of Classification Search
None
See application file for complete search history.

(56) References Cited

U.S. PATENT DOCUMENTS

| | | | |
|---|---|---|---|
| 2004/0030261 A1* | 2/2004 | Rantala | A61B 5/0285 600/561 |
| 2011/0144456 A1* | 6/2011 | Muhlsteff | A61B 5/022 600/490 |

(Continued)

OTHER PUBLICATIONS

Xu et al. "Motion-Artifact Reduction in Capacitive Heart-Rate Measurements by Adaptive Filtering," in IEEE Transactions on Instrumentation and Measurement, vol. 68, No. 10, pp. 4085-4093, Oct. 2019. (Year: 2019).*

*Primary Examiner* — Meredith Weare
(74) *Attorney, Agent, or Firm* — NCC-IP; Nevin Stuart Carmichael

(57) ABSTRACT

The present invention provides a method, a device, an electronic apparatus, and a storage medium for processing multi-modal physiological signals, which relates to the field of health engineering. The method comprises: acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal and a target ultrasound signal; determining a continuous physiological information of a target subject, especially a continuous blood pressure information, according to the continuous target multi-modal physiological signals. The present invention determines the continuous physiological information by acquiring the continuous multi-modal physiological signals, so that the physiological information acquired is more accurate, and is more beneficial to the timely detection of abnormal physiological information, so that patients can be treated in time.

11 Claims, 7 Drawing Sheets

Acquiring continuous target multi-modal physiological signals — S101

Determining a continuous physiological information of a target subject according to the continuous target multi-modal physiological signals. — S102

(51) Int. Cl.
  *A61B 5/021* (2006.01)
  *A61B 5/024* (2006.01)
  *A61B 5/347* (2021.01)
  *A61B 8/04* (2006.01)
  *A61B 18/00* (2006.01)

(52) U.S. Cl.
  CPC .......... *A61B 5/02416* (2013.01); *A61B 5/347* (2021.01); *A61B 5/721* (2013.01); *A61B 8/04* (2013.01); *A61B 2018/00875* (2013.01)

(56) References Cited

U.S. PATENT DOCUMENTS

| | | | |
|---|---|---|---|
| 2013/0041268 A1* | 2/2013 | Rimoldi | A61B 5/0295 600/479 |
| 2013/0338460 A1* | 12/2013 | He | A61B 5/0006 600/479 |
| 2014/0039824 A1* | 2/2014 | Zheng | A61B 5/316 600/509 |
| 2014/0288394 A1* | 9/2014 | LeBoeuf | A61B 5/0295 600/478 |
| 2016/0345844 A1* | 12/2016 | McCombie | A61B 5/02125 |
| 2017/0020459 A1* | 1/2017 | Al Hatib | A61B 5/0002 |
| 2017/0027456 A1* | 2/2017 | Kinast | A61B 7/02 |
| 2017/0215749 A1* | 8/2017 | Zhuo | A61B 5/02055 |
| 2017/0347894 A1* | 12/2017 | Bhushan | A61B 5/33 |
| 2020/0335211 A1* | 10/2020 | Gopalakrishnan | G06F 8/61 |
| 2021/0204824 A1* | 7/2021 | Wang | A61B 5/02233 |
| 2023/0190100 A1* | 6/2023 | Stump | A61B 5/021 600/301 |
| 2023/0404414 A1* | 12/2023 | Zhang | A61B 5/6805 |

* cited by examiner

METHOD, A DEVICE, AN ELECTRONIC APPARATUS AND A STORAGE MEDIUM FOR PROCESSING MULTI-MODAL PHYSIOLOGICAL SIGNALS

FIELD OF THE INVENTION

The present invention relates to the field of health engineering, specifically, the present invention relates to a method, apparatus, electronic device and storage medium for processing multi-modal physiological signals.

BACKGROUND OF THE INVENTION

The prevention and control of cardiovascular disease relies heavily on measured blood pressure (BP), and therefore, the measurement of blood pressure is of great importance. In order to measure the blood pressure of patients with cardiovascular diseases as uninterruptedly as possible, wearable blood pressure measurement devices have been created for this purpose. Wearable blood pressure measurement devices mainly include single-modal sensor-based measurement devices and dual-modal sensor-based measurement.

Single-modal sensor measurement devices and dual-modal sensor measurement measurements are mostly limited to single or two dimensions (single dimension such as PPG signal and IPG signal, etc. of any one signal, two dimensions such as PPG signal combined with PTT and IPG signal combined with cross-sectional area change, etc.) measured signals to determine blood pressure values, both have large errors, in addition, by single-modal sensor measurement devices and dual-modal sensor measurement devices are measured as a single blood pressure, and the single measurement of blood pressure cannot accurately determine the change in blood pressure, which is not conducive to detecting blood pressure in patients with cardiovascular disease.

OBJECTS OF THE INVENTION

An object of the present invention is to provide a method and an apparatus for processing multi-modal physiological signals.

The above object is met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

Embodiments of the present invention provide a method, apparatus, electronic device, computer readable storage medium, and computer program product for blood pressure measurement that can solve the existing problem of inaccurate physiological information from a single-modal or dual-modal measurement. The described technical solution is as follows.

According to a first aspect of embodiments of the present invention, a method of blood pressure measurement is provided, the method comprising: acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal, a target pressure signal and a target ultrasound signal; determining a continuous physiological information of a target subject according to the continuous target multi-modal physiological signals.

In one possible implementation, wherein the step of acquiring continuous target multi-modal physiological signals comprises: acquiring continuous, original multi-modal physiological signals, the original multi-modal physiological signals comprise at least three original physiological signals of an original temperature signal, an original IPG signal, an original ECG signal, an original PPG signal, an original pressure signal and an original ultrasound signal; the original multi-modal physiological signals comprises a motion noise signal and powerline interference (PLI); at any time of the original multi-modal physiological signals, performing a time division multiplexing (TDM) process on the original multi-modal physiological signals to obtain a multiplexed multi-modal physiological signals; acquiring an accelerometer signal; the accelerometer signal comprises a reference PLI and a reference motion noise signal; performing an adaptive filtering process on the multiplexed multi-modal physiological signals according to the reference PLI and the reference motion noise signal, performing a time division process on a filtered multi-modal physiological signals to obtain a target multi-modal physiological signals.

In one possible implementation, wherein the physiological information comprises a first blood pressure information; the first blood pressure information comprises a first diastolic blood pressure, a first pulse pressure and a first systolic blood pressure; the step of determining the continuous physiological information of the target subject according to the target continuous multi-modal physiological signals comprising: at any time, determining a blood temperature of the target subject according to the target temperature signal; determining a maximum impedance value of a target measurement segment according to the target IPG signal; determining a cardiac cycle of the target subject according to the target ECG signal; determining a first difference corresponding to a change in the impedance of the target subject during the cardiac cycle according to the target ECG signal and the target IPG signal; determining a pulse transit time (PTT) required for a pulse wave to pass through the target measurement segment according to the target ECG signal and the target PPG signal; determining a length of the target measurement segment according to the target IPG signal; the target measurement segment comprises a target arterial segment and tissues surrounding the target arterial segment; determining the first diastolic blood pressure of the target subject according to the cardiac cycle, the length of the target measurement segment, the maximum impedance value and the blood temperature; determining the first pulse pressure of the target subject according to the first difference and the PTT; taking sum of the first diastolic blood pressure and the first pulse pressure as the first systolic blood pressure of the target subject; presenting the first diastolic blood pressure, the first pulse pressure and the first systolic blood pressure at respective time in a time axis to obtain a continuous first diastolic blood pressure, a continuous first pulse pressure and a continuous first systolic blood pressure respectively.

In one possible implementation, wherein the step of determining the first diastolic blood pressure of the target subject according to the cardiac cycle, the length of the target measurement segment, the maximum impedance value and the blood temperature comprises: substituting the cardiac cycle, the length of the target measurement segment, the maximum impedance value and the blood temperature into a first target formula to obtain the first diastolic blood pressure of the target subject; the first target formula being:

$$DBP = P_0 * \exp\left(-K_1 \frac{tL(b-Z_{max})^2 e^{0.02T}}{(bZ_{max})^2}\right)$$

wherein, DBP is the first diastolic blood pressure, exp is an exponential function with base e, t is the cardiac cycle, L is the length of the target measurement segment, $Z_{max}$ is the maximum impedance value, T is the blood temperature, $P_0$ is an end-systolic aortic pressure, $P_0$ is a constant, $K_1$ and b are calibration parameters, $K_1$ and b are constants.

In one possible implementation, wherein the step of determining the first pulse pressure of the target subject according to the first difference and the PTT comprises:

substituting the first difference and the PTT into a second target formula to obtain the first diastolic blood pressure of the target subject; the second target formula being:

$$PP = K_2 * \frac{\Delta Z}{PTT^2}$$

wherein PP is the first pulse pressure, $K_2$ is a calibration parameter, $K_2$ is a constant, PTT is the PTT, $\Delta Z$ is the first difference.

In one possible implementation, wherein the physiological information comprises a second blood pressure information; the second blood pressure information comprises a second diastolic blood pressure, a second pulse pressure and a second systolic blood pressure; the step of determining the continuous physiological information of the target subject according to the target continuous multi-modal physiological signals comprises:

at any time, determining a ratio of a vessel diameter to a vessel thickness of the target arterial segment according to the target ultrasound signal; determining a second systolic blood pressure and a second diastolic blood pressure of the target subject according to the PTT and the ratio respectively; taking difference between the second systolic blood pressure and the second diastolic pressure as the second pulse pressure of the target subject; presenting the second systolic blood pressure, the second pulse pressure and the second diastolic blood pressure at respective time in a time axis to obtain a continuous second systolic blood pressure, a continuous second pulse pressure and a continuous second diastolic blood pressure respectively.

In one possible implementation, wherein the step of determining the second systolic blood pressure and the second diastolic blood pressure of the target subject according to the PTT and the ratio respectively comprises: substituting the PTT and the ratio into a third target formula and a fourth target formula respectively to obtain the second systolic blood pressure and the second diastolic blood pressure; the third target formula being:

SBP=$K_3$ ln(r/PTT$^2$)+a wherein, SBP is the systolic blood pressure, r is the ratio of the vessel diameter to the vessel thickness of the target arterial segment, ln is the logarithmic function with base e, PTT is the pulse transit time; $K_3$ and a are calibration parameters, $K_3$ and a are constants; the fourth target formula being:

DBP=$K_4$ ln(r/PTT$^2$)+c wherein, DBP is the diastolic blood pressure, r is the ratio of the vessel diameter to the vessel thickness of the target arterial segment, ln is the logarithmic function with base e, PTT is the pulse conduction time, $K_4$ and c are calibration parameters, $K_4$ and c are constants.

In one possible implementation, wherein the step of determining the continuous physiological information of the target subject according to the continuous target multi-modal physiological signals comprises: determining a mean value of the first diastolic blood pressure and the second diastolic blood pressure at the same time, using the mean value of the first diastolic blood pressure and the second diastolic blood pressure as a target diastolic blood pressure; determining a mean value of the first pulse pressure and the second pulse pressure at the same time, using the mean value of the first pulse pressure and the second pulse pressure as a target pulse pressure; determining a mean value of the first systolic blood pressure and the second systolic blood pressure at the same time, using the mean value of the first systolic blood pressure and the second systolic blood pressure as a target systolic blood pressure; presenting the target diastolic blood pressure, the target pulse pressure and the target systolic blood pressure at respective time in a time axis to obtain a continuous target diastolic blood pressure, a continuous target pulse pressure and a continuous target systolic blood pressure respectively.

In one possible implementation, wherein after obtaining the continuous target diastolic blood pressure, the continuous target pulse pressure and the continuous target systolic blood pressure, the step further comprising: determining a body position change of the target subject by the accelerometer signal, calibrating the continuous target diastolic blood pressure, continuous target pulse pressure and the continuous target systolic blood pressure according to the body position change; determining a change value of pressure applied to blood pressure measurement parts of the target subject according to the target pressure signal, calibrating the continuous target diastolic blood pressure, continuous target pulse pressure and the continuous target systolic blood pressure according to the change value of the pressure.

In one possible implementation, wherein after the step of determining the continuous physiological information of the target subject according to the continuous target multi-modal physiological signals, the step further comprising: if a value corresponding to the continuous physiological information exceeds a corresponding pre-set threshold or pre-set threshold range, at least one of conducting a local alarm call or sending an alarm information to an emergency contact person or an ambulance center.

According to a second aspect of embodiments of the present invention, there is provided an apparatus for processing multi-modal physiological signals, comprising: a multi-modal physiological signals acquiring module for acquiring continuous target multi-modal physiological signals, the target multi-modal physiological signals comprise at least three target multi-modal physiological signals of a target temperature signal, a target IPG signal, a target ECG signal, a target PPG signal, a target pressure signal and a target ultrasound signal; a physiological information determining module for determining a continuous physiological information of a target subject according to the continuous target multi-modal physiological signals.

According to a third aspect of embodiments of the present invention, there is provided an electronic apparatus, comprising a memory, a processor and a computer program stored in the memory, wherein the processor executes the computer program to implement the method steps according to the first aspect.

According to a fourth aspect of embodiments of the present invention, there is provided a computer-readable storage medium on which a computer program is stored, wherein, when the computer program is executed by a processor, implements the method steps according to the first aspect.

According to a fifth aspect of embodiments of the present invention, there is provided a computer program product, the computer program product comprising computer instructions, the computer instructions being stored in a computer readable storage medium, when a processor of the computer device reads the computer instructions from the computer readable storage medium, the processor executes the computer instructions such that the computer device performs the steps of implementing the method steps according to the first aspect.

The present invention determines continuous physiological information of the target object by obtaining continuous target multi-modal physiological signals, the target multi-modal physiological signals including at least three target physiological signals among the target temperature signal, the target IPG signal, the target electrocardiographic signal, the target PPG signal, and the target ultrasound signal; based on the continuous target multi-modal physiological signals The present invention determines the continuous physiological information by acquiring the continuous multi-modal physiological signals, so that the physiological information acquired is more accurate, and is more beneficial to the timely detection of abnormal physiological information, so that patients can be treated in time.

DESCRIPTION OF PREFERRED EMBODIMENTS

Figure 1:
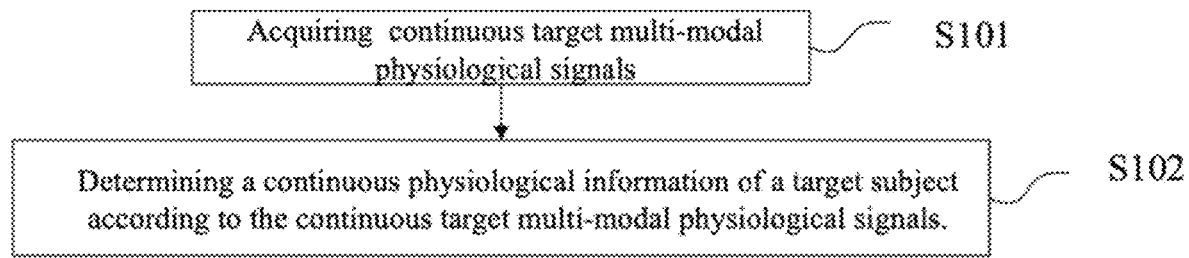
FIG. 1 shows a flow diagram of a processing method for multi-modal physiological signals provided in an embodiment of the present invention.

Embodiments of the present invention are described below in connection with the accompanying drawings in the present invention. It should be understood that the embodiments set forth below in connection with the accompanying drawings are exemplary descriptions for the purpose of explaining the technical solutions of the embodiments of the present invention and do not constitute limitations to the technical solutions of the embodiments of the present invention.

It will be understood by those skilled in the art that, unless specifically stated, the singular forms "one", "a", "said" and "the" used herein "may also include the plural form. It should be further understood that the terms "include" and "comprise" as used in the embodiments of the present invention mean that the corresponding features may be implemented as the features, information, data, steps, operations, components and/or assemblies presented, but do not exclude the implementation of other features, information, data, operations, components and/or assemblies supported in the art. It is to be understood that when we refer to a component as a feature, information, data, step, operation, element, component, and/or assembly, it is to be understood that it is to be implemented as the feature, information, data, step, operation, component, and/or assembly presented. It should be understood that when we refer to a component being "connected" or "coupled" to another component, the component may be directly connected or coupled to the other component, or it may refer to the component and the other component being connected through an intermediate component. In addition, the "connection" or "coupling" as used herein may include wireless connection or wireless coupling. The term "and/or" as used herein indicates at least one of the items defined by the term, for example, "A and/or B" may be implemented as "A", or as "B", or "A and B".

In order to make the purpose, technical solutions and advantages of the present invention clearer, the embodiments are described in further detail below in conjunction with the accompanying drawings.

Cardiovascular disease is the leading cause of death and disability worldwide, with the World Health Organization showing in a 2017 study that cardiovascular disease accounts for 31.8% of total deaths worldwide. Among the multiple causative factors of cardiovascular diseases, hypertension tops the list and is the most important risk factor, and the number of cardiovascular patient deaths due to the presence of hypertension exceeded 10 million in 2017, an increase of more than 3 million compared to 1990, significantly higher than other risk factors, making continuous noninvasive blood pressure monitoring in daily life important. In addition, more than two-thirds of sudden cardiac deaths occur outside the hospital. There is therefore an urgent need for wearable medical devices to monitor individual cardiovascular risk factors frequently, accurately and unobtrusively in daily life. However, there are currently limited devices and methods suitable for long-term and comprehensive cardiovascular monitoring. Among these, arterial blood pressure is a major risk factor for cardiovascular disease, and although current cuff-based arterial blood pressure measurements are non-invasive, these devices cause consumer discomfort during cuff inflation and provide only intermittent transient arterial blood pressure values. Continuous blood pressure information without a cuff is not currently available for long-term accurate measurement using portable or wearable devices, so there is an urgent need to use wearable devices to enable measurement of more important cardiovascular parameters.

For traditional single blood pressure measurements, the metrics commonly used for participation assessment are relatively well established. Sleeveless, unperturbed continuous blood pressure measurements, as opposed to single blood pressure measurements, provide richer physiological information by measuring systolic and diastolic blood pressure and beat-to-beat blood pressure changes over time, providing additional information for the diagnosis and treatment of hypertension, which can be used in the assessment of the cardiovascular system and for early diagnosis of disease.

A new study published in Circulation predicts that achieving and maintaining the 2017 ACC/AHA published goal of lowering blood pressure therapy from the previous 140/90 mmHg to 130/80 mmHg may achieve the prevention of 3 million cardiovascular disease events over the next decade. Another study showed that nearly 50% of people with hypertension worldwide are undiagnosed, in part because of "occult hypertension" (office blood pressure <140/90 mmHg and home blood pressure ≥135/85 mmHg). Occult hypertension is particularly present in the adult population, where the prevalence of occult hypertension is close to 10% and the incidence of stroke and myocardial infarction is as high as that of normal hypertension; however, occult hypertension often requires 24-hour ambulatory blood pressure monitoring and observation to expose it. In addition, during the COVID-19 pandemic, COVID-19 is known to be an infectious disease involving multiple organs with high transmission rates, severe adverse outcomes, high economic burden, and airborne and droplet transmission to adults and children, newborns, pregnant women, and the elderly, affecting all age groups. Among the multiple complications caused by COVID-19, the top two most prevalent complications are hypertension and cardiovascular disease, accounting for 20.7% and 9.6%, respectively, which are also prognostic factors for the severity of COVID-19. Hypertension is known to be a strong predictor of poor prognosis in patients with COVID-19, including higher mortality, severe COVID-19, acute respiratory distress syndrome, need for ICU admission, and progressive disease.

Therefore, monitoring for cardiovascular disease is critical, but that early detection cannot rely solely on medical visits, but also requires patients to have an awareness of autonomous health management and self-measurement of their health status. Wearable blood pressure measurement devices have been developed to measure the blood pressure of patients with cardiovascular diseases at all times. Wearable blood pressure measurement devices mainly include single-modal sensor-based measurement devices and dual-modal sensor-based measurement. Among them, the single-modal sensor-based measurement device measures any one of the PPG signal, ultrasound signal, IPG signal and ECG signal, and calculates the patient's blood pressure value by measuring any one of the signals; there are three main types of measurement methods for blood pressure measurement based on the bimodal sensor measurement device: PPG signal measurement that considers the PTT, ultrasound signal measurement The way in which inter-vessel variation is taken into account, and the way in which IPG signal measurement takes into account changes in the cross-sectional area of blood vessels.

Whether based on single-modal sensor measurement devices and based on dual-modal sensor measurement measurements, most measurements are limited to single or two dimensions to determine the blood pressure value, both of which are subject to large errors and cannot accurately determine the blood pressure value and the variation of the blood pressure value, which is not conducive to detecting the blood pressure of patients with cardiovascular diseases.

The present invention provides blood pressure measurement methods, devices, electronic devices, computer readable storage media, and computer program products designed to solve technical problems of the prior art as described above.

The technical solutions of the embodiments of the present invention and the technical effects resulting from the technical solutions of the present invention are described below through the description of several exemplary embodiments. It should be noted that the following embodiments can be cross-referenced, borrowed or combined with each other, and the descriptions of the same terms, similar features, and similar implementation steps, etc. in different embodiments will not be repeated.

A method of processing multi-modal physiological signals is provided in this embodiment, as shown in FIG. 1, the method comprising Step S101, acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal, a target pressure signal and a target ultrasound signal.

Embodiments of the present invention can obtain continuous multi-modal physiological signals through a multi-modal sensor, which can be a wearable device, and the multi-modal sensors can combine at least three of a temperature sensor, an IPG sensor, an ECG electrode, an PPG sensor, a pressure sensor, an ultrasound sensor, and an accelerometer sensor, and currently, the multi-modal sensors can also include other sensors, which are not limited by this embodiment.

Among them, the temperature sensor is used to collect the original temperature signal, the IPG sensor is used to collect the original IPG signal, the ECG electrode is used to collect the original ECG signal, the optical sensor is used to collect the original PPG signal, the pressure sensor is used to collect the original pressure signal, the ultrasound sensor is used to collect the original ultrasound signal, the accelerometer sensor is used to collect the original accelerometer The signals obtained through the sensors are the original signals.

Similarly, the embodiment of the present invention can acquire continuous, raw multi-modal physiological signals by multi-modal sensors, and obtain target multi-modal physiological signals after processing the raw multi-modal physiological signals.

The target multi-modal physiological signals of the present embodiment comprise at least three target physiological signals of a target temperature signal, a target IPG signal, a target ECG signal, a target PPG signal, a target pressure signal and a target ultrasound signal.

In step S102, determining a continuous physiological information of a target subject according to the continuous target multi-modal physiological signals.

After obtaining the continuous target multi-modal physiological signals, the present embodiment can determine the continuous physiological information of the target object based on at least three of the target multi-modal physiological signals. The physiological information can be blood pressure, heart rate, etc. The present embodiment does not limit the specific physiological information, which can be any physiological information.

The present embodiment determines the continuous physiological information of the target object by the continuous target multi-modal physiological signals, and the continuous physiological information can be made into continuous physiological information maps for determining the changes of the physiological information.

Embodiments of the present invention determine continuous physiological information of a target object by obtaining continuous target multi-modal physiological signals, the target multi-modal physiological signals comprising at least three target physiological signals of a target temperature signal, a target impedance IPG signal, a target ECG signal, a target PPG signal, a target pressure signal and a target ultrasound signal; based on the continuous target multi-modal physiological signals to determine continuous physiological information of a target object. The present invention determines the continuous physiological information by acquiring the continuous multi-modal physiological signals, so that the physiological information acquired is more accurate, and is more beneficial to the timely detection of abnormal physiological information, so that patients can be treated in time.

Embodiments of the present invention provide a possible implementation of acquiring continuous target multi-modal physiological signals, comprising, acquiring a continuous, original multi-modal physiological signals, the original multi-modal physiological signals comprises at least three original physiological signals of an original temperature signal, an original IPG signal, an original ECG signal, an original PPG signal, an original pressure signal and an original ultrasound signal; the original multi-modal physiological signals comprises a motion noise signal and powerline interference (PLI); at any time of the original multi-modal physiological signals, performing a time division multiplexing (TDM) process on the original multi-modal physiological signals to obtain a multiplexed multi-modal physiological signals; acquiring an accelerometer signal; the accelerometer signal comprises a reference PLI and a reference motion noise signal; performing an adaptive filtering process on the multiplexed multi-modal physiological signals according to the reference PLI and the reference motion noise signal, performing a time division process on a filtered multi-modal physiological signals to obtain a target multi-modal physiological signals.

For wearable devices, motion is always present in our daily activities. In addition to monitoring physiological signals in daily activities, motion noise and external environment are also a serious noise source, which can degrade signal integrity, so reducing such noise signals, especially motion noise signals, to obtain high-quality signals is essential for wearable signals and systems.

The multi-modal physiological signals directly obtained by the multi-modal sensors in this embodiment is the original multi-modal physiological signals, and the original multi-modal physiological signals includes motion noise interference and PLI, so the original multi-modal physiological signals need to be filtered.

The target physiological signals such as target blood temperature signal, target IPG signal, target ECG signal, target pressure signal, target PPG signal and target ultrasound signal in this embodiment are the signals obtained by pre-processing the corresponding original signals and adaptive filtering, and the pre-processing includes amplifying the signals twice, specifically, preamplification processing is performed first, and preamplification After processing, the signal is input to the main amplifier for subsequent amplification, and then filtered according to the frequency characteristics of the signal to reduce noise interference to obtain a signal band carrying physiological information, the signal band is the target physiological signals, the target physiological signals are analog signals, and the target signals can be subsequently converted to a digital signals through an analog-to-digital conversion unit for wireless transmission to a PC or a cell phone for display, so that subsequently, the corresponding physiological data can be obtained according to the digital signals corresponding to various signals. In this signal transmission process, since the physiological signal strength is still very weak, signal modulation processing is considered through high frequency and high energy carrier signals to achieve efficient and fidelity transmission over a specific distance.

For the original multi-modal physiological signals acquired at any time, the original multi-modal physiological signals are performed TDM to obtain the multiplexed multi-modal physiological signals first, and the multiplexing of the original multi-modal physiological signals can make the multi-modal signal occupy one channel, without using multiple channels.

The multiplexed multi-modal physiological signals of this embodiment still have motion noise signal interference and PLI, so the multiplexed multi-modal physiological signal needs to be filtered to get the noise-reduced multi-modal physiological signals.

This embodiment obtains the accelerometer signal through the accelerometer sensor; the accelerometer signal includes the reference PLI and the reference motion noise signal.

The multiplexed multi-modal physiological signals is subjected to adaptive filtering processing according to the reference PLI and the reference motion noise signal, and the filtered multi-modal physiological signals is subjected to time division processing to obtain the target multi-modal physiological signals.

In a non-stationary environment, the multi-modal system uses accelerometer signal as a noise monitoring channel, where the accelerometer is placed at any location that will not be disturbed by cardiac activity, such as the surface of a wearable watch, as a noise reference signal for adaptive noise reduction processing, as a reference input, which can reflect the real motion rather than the noise generated by experience, and the original input is the original multi-modal physiological signals. The subsequent debugging is considered for the difference between the original input signal and the sampling frequency of reference input. This embodiment can be reduced by the first stage of the PLI, the second stage is used to reduce the motion noise.

Figure 2:
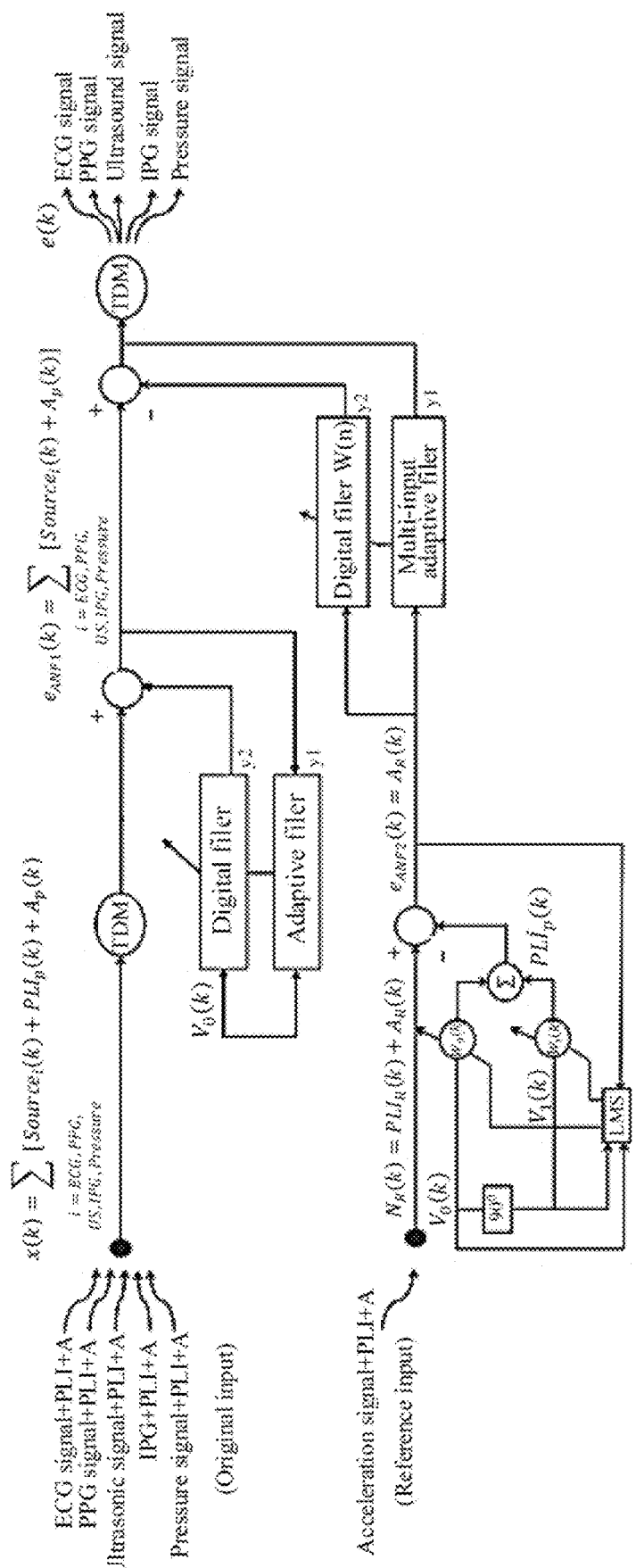
FIG. 2 shows a diagram of the connection relationship of an adaptive filter provided for reducing powerline interference and motion noise in this embodiment.

FIG. 2 shows the connection relation of the filter for reducing the PLI signal, consisting of an adaptive filter and an adaptive notch filter, named $y_1$ and $y_2$, respectively, placed in parallel for reducing the PLI contained in the original and reference input signals.

The original and reference input signals of the proposed design are as follows:

$$x(k) = \sum_{\substack{i=ECG,PPG,\\US,IPG,Pressure}} [\text{Source}_i(k) + PLI_p(k) + A_p(k)] \quad (1)$$

$$N_R = PLI_R(k) + A_R(k) \quad (2)$$

wherein, $N_R$ denotes the reference noise signal, including the reference PLI, $PLI_p(k)$ as well as the reference motion noise signal. $PLI_p(k)$, the PLI in the original multi-modal physiological signals; $A_p(k)$, the motion noise signal in the original multi-modal physiological signals; $x(k)$, the original multi-modal physiological signals; $\text{Source}_i(k)$, denotes the target physiological signals obtained after noise reduction, which can be any one of the target temperature signal, the target IPG signal, the target ECG signal, the target PPG signal, the target pressure signal, and the target ultrasound signal, and i denotes any one of the original physiological signals in the original multi-modal physiological signals.

Figure 3:
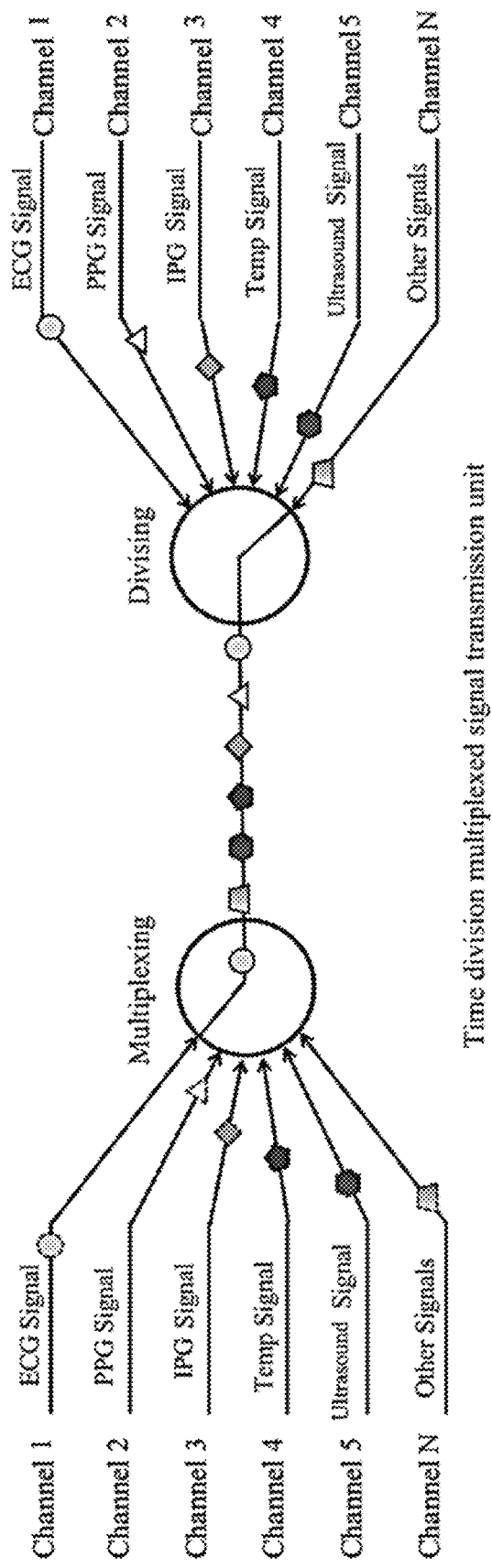
FIG. 3 shows a schematic diagram of the transmission of the original multi-modal physiological signals provided by the embodiment of the present invention.
Figure 4:
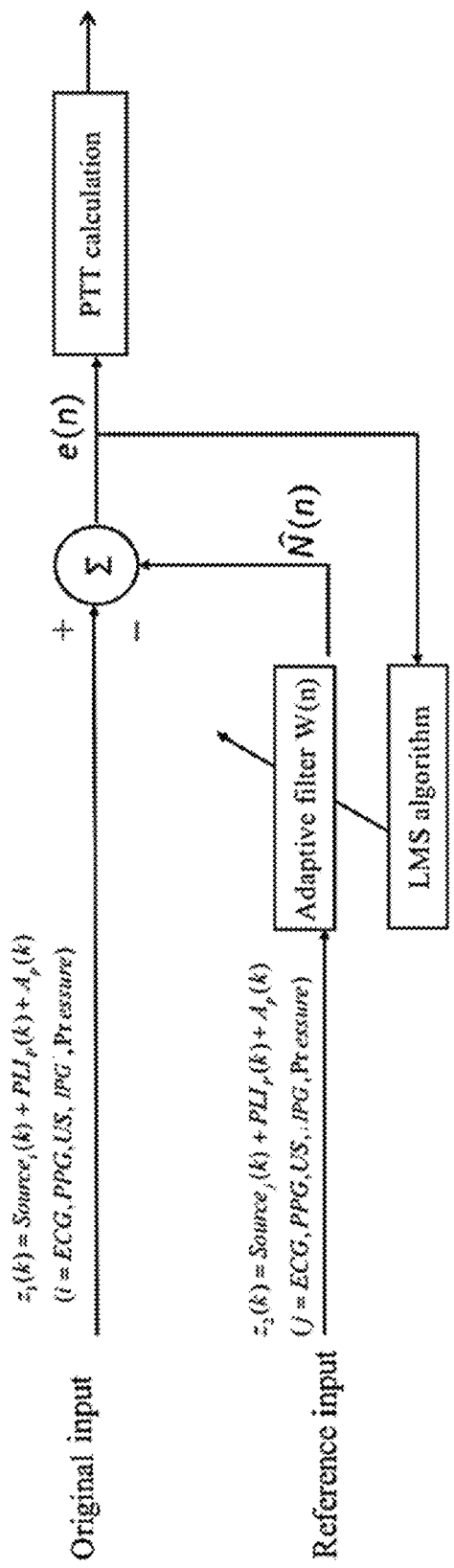
FIG. 4 shows a schematic diagram of noise reduction of the signal to obtain PTT information provided by the present embodiment.

As shown in FIG. 3, it exemplarily illustrates the transmission diagram of the original raw multi-modal physiological signals collected by the embodiment of the present invention, which can be transmitted by the way of multiplexing and then dividing, so that the transmission of the multi-modal signals does not require the use of multiple channels, and the signal single channel output of the timing logic can be realized by setting the clock signal only.

By estimating the noise reference signal and effectively reducing the noise in the multi-modal signal, especially PLI and motion noise according to the coefficients of the filter order, the noise reduction signal e(k) is obtained and then the signal is decomposed one by one by the time division control unit to obtain the multi-modal useful signals, which makes the estimation of multiple physiological information, especially blood pressure information, more reliable. The other category designs the original input as one of the multi-modal physiological signals, and the reference input is multi-modal signals that removed one of original multi-modal signal. The phase information is obtained after considering the removal of the phase error caused by the filter itself, and the method has the potential to use the phase information to calculate the PTT for blood pressure estimation.

A possible implementation is provided in this embodiment, wherein the physiological information comprises a first blood pressure information; the first blood pressure information comprises a first diastolic blood pressure, a first pulse pressure and a first systolic blood pressure; the step of determining the continuous physiological information of the target subject according to the target continuous multi-modal physiological signals comprising: at any time, determining a blood temperature of the target subject according to the target temperature signal; determining a maximum impedance value of a target measurement segment according to the target IPG signal; determining a cardiac cycle of the target subject according to the target ECG signal; determining a first difference corresponding to a change in the impedance of the target subject during the cardiac cycle according to the target ECG signal and the target IPG signal; determining a pulse transit time (PTT) required for a pulse wave to pass through the target measurement segment according to the target ECG signal and the target PPG signal; determining a length of the target measurement segment according to the target IPG signal; the target measurement segment comprises a target arterial segment and tissues surrounding the target arterial segment; determining the first diastolic blood pressure of the target subject according to the cardiac cycle, the length of the target measurement segment, the maximum impedance value and the blood temperature; determining the first pulse pressure of the target subject according to the first difference and the PTT; taking sum of the first diastolic blood pressure and the first pulse pressure as the first systolic blood pressure of the target subject; presenting the first diastolic blood pressure, the first pulse pressure and the first systolic blood pressure at respective time in a time axis to obtain a continuous first diastolic blood pressure, a continuous first pulse pressure and a continuous first systolic blood pressure respectively.

After obtaining the multi-modal physiological signals, the embodiment of the present invention can obtain corresponding physiological data for the multi-modal physiological signals, and the corresponding physiological information can be obtained by processing these physiological data.

The physiological information of this embodiment can be the blood pressure information of the target object, and the first blood pressure information can be determined by four physiological signals, and the second blood pressure information can be determined by three physiological signals, and the first blood pressure information or the second blood pressure information can be used as the target blood pressure information of the measurement alone, or the weighted average of the first blood pressure information and the second blood pressure information can be used as the target blood pressure information. This is not limited by the embodiments of this invention.

Of course, other physiological information can be determined by other amounts or types of signals, and this is not limited by embodiments of the present invention.

After obtaining the target temperature signal, the present embodiment converts the target temperature signal into a digital signal corresponding to the blood temperature, and determines the blood temperature corresponding to the digital signal.

After determining the blood temperature, the embodiment of the present invention determines the blood viscosity corresponding to the blood temperature.

The temperature signal responds to the temperature information of the skin, tissues and blood. The blood temperature signal determines the temperature information in the blood. The elasticity of peripheral arteries is determined by blood pressure and vascular smooth muscle contraction, and an experiment has shown that the pressure-diameter relationship of peripheral arteries differs between relaxed and contracted states. Therefore, temperature changes can also affect blood pressure regulation. The cold test leads to significant vasoconstriction of small arteries, especially peripheral arteries, altering peripheral vascular resistance thereby increasing blood pressure levels. In our daily life, sudden changes in temperature due to changes in the external environment such as moving from indoor to outdoor environment in winter can cause changes in blood pressure, and it becomes challenging to accurately track blood pressure changes in the presence of temperature changes. Since blood viscosity is evident in the microcirculation, blood viscosity is a factor that cannot be ignored in changes in peripheral vascular resistance. Viscosity is a function of the properties of the fluid itself, usually depending on its composition and temperature, so embodiments of the present invention consider the change in blood viscosity by temperature.

Embodiments of the present invention determine the relationship between blood temperature and blood viscosity by equation (3), which is, $$\eta = 0.23 \exp[(c_0 - c_3 T)H - c_2 T] \# \qquad (3)$$

where $\eta$ is the blood viscosity, H is the hematocrit (which can be considered as a constant), $c_0$, $c_1$, and $c_2$ are three constants, and T is the blood temperature. The hematocrit value for the calculation process is 47%, which corresponds to a normal healthy value, and $c_0$, $c_1$, and $c_2$ are three constants of 0.0332, 1.08*10−4, and 0.02, respectively.

The present embodiment determines the blood viscosity by substituting the blood temperature into the above equation after the blood temperature is determined.

The target IPG signal of the present embodiment is obtained by controlling the operating frequency of the IPG sensor, and the sensing coverage of the tissue can be adjusted from a few millimeters to a few centimeters to obtain different IPG signals. Among them, the arterial impedance caused by small changes in arterial blood volume can be obtained by the relationship between the change in arterial size and the change in arterial impedance. Thus, the impedance expressed by the IPG signal allows to determine the radius change of the artery with the cross-sectional area information, and the blood pressure information is obtained by calibration. In addition, in addition to responding to blood volume changes, changing the operating frequency, information on tissue composition, resistivity and structural composition of the body can be obtained by analyzing the frequency response of different tissue electrical impedances, which can be used to obtain blood pressure information in connection.

The target measurement segment of this embodiment includes the target arterial segment and the surrounding tissue of the target arterial segment, and this embodiment assumes that the target measurement segment is modeled from a uniform cylinder obtained from the target arterial segment and the surrounding tissue, and the target measurement segment is regarded as the arterial segment in the subsequent process.

The impedance of the target measurement segment can be considered as a model of blood and surrounding tissue in parallel in the target arterial segment, so the relationship between the impedance of the target measurement segment and the impedance of the target arterial segment and surrounding tissue can be expressed as Equation (4) that, $$\frac{1}{Z} = \frac{1}{Z_a} + \frac{1}{Z_t} \quad \#(4)$$

where Z is the impedance of the target measurement segment, and $Z_a$ and $Z_t$ are the impedances of the target arterial segment and the surrounding tissue of the target arterial segment, respectively.

The relationship between impedance and cross-sectional area can be expressed by equation (5), $$Z = \frac{L}{\sigma A} \quad \#(5)$$

In equation (5) above, Z denotes the impedance of the target measurement segment, σ is the conductivity, L is the length of the target measurement segment, and A is the cross-sectional area of the target measurement segment.

It is assumed that the impedance of the target arterial segment in the target measurement segment, as well as the surrounding tissue, remains constant for a subject-specific constant, so that the measured impedance change ΔZ can be monitored in response to changes in arterial impedance. When small blood volume changes occur, the change in the cross-sectional area of the artery ΔAa can be obtained as a function of the change in the measured impedance ΔZ. Furthermore, ΔZ is proportional to the change in the radius of the artery ΔR (excluding changes in the mean arterial radius Rm), as shown in equation (6) below:

$$\Delta A = 2\pi R_m \Delta R = \frac{L \Delta Z}{\sigma Z_0^2} \quad \#(6)$$

where L and $Z_0$ are the length of the target measurement segment and the original impedance, which is the blood resistivity, and ΔZ is the changing impedance, which is the radius of the artery, which is the change of the arterial radius.

The cardiac cycle, in which the internal pressure decreases when the heart is diastolic and blood flows back into the heart from the vena cava and increases when the heart is systolic and pumps blood to the arteries, constitutes one cardiac cycle for each contraction and diastole of the heart.

The ECG signal responds to the changes in electrical activity generated by the heart during each cardiac cycle. The R-R interval is used to accurately provide the interval between each heartbeat activity in the human body, and the ECG signal has been widely used to diagnose and monitor cardiac abnormalities, especially myocardial infarction.

The arterial Windkessel model describes the relationship between time-varying blood pressure, arterial compliance, and total peripheral resistance, modeling the systemic arterial system as an equivalent aggregate circuit consisting of a capacitor (representing arterial compliance C) and a resistor (representing total peripheral resistance TPR). Thus, based on the arterial Windkessel model, the exponential decay of blood pressure after aortic valve closure can theoretically be expressed as diastolic DBP by (7), and equation (7) is:

$$DBP = P_0 * e^{\frac{-t}{TPR*C}} \quad (7)$$

where denotes the diastolic blood pressure of the target subject, $P_0$ denotes the first pulse pressure, which is the pulse pressure after aortic valve closure, TPR denotes total peripheral resistance, C denotes arterial compliance, which is constant in the short term, t is the cardiac cycle, and exp is an exponential function with a base of e.

Peripheral resistance is the resistance of the circulatory system to blood flow. The resistance generated by the peripheral circulation is the systemic vascular resistance, also known as total peripheral resistance. Peripheral resistance is generated and controlled primarily by small, variable constriction arteries, but may also be generated and controlled by capillaries and other factors such as viscosity that also cause resistance to the peripheral flow of blood. According to Poiseuille's law, the peripheral resistance of a vessel can be determined by equation (4).

$$TPR = \frac{8\pi \eta L}{A_a^2} \quad \#(8)$$

where TRP is the total peripheral resistance, L is the length of the target measurement segment, and $A_a$ is the cross-sectional area of the target arterial measurement segment and is the blood viscosity.

The cross-sectional area of the target arterial measurement segment, $A_a$, can be expressed according to the above equation (5) as $A_a = L/\sigma_b Z_a$ (L is the length of the target measurement segment, A is the cross-sectional area of the target arterial measurement segment, and is the blood conductivity).

After determining the length L of the target measurement segment, the cross-sectional area $A_a$ of the target arterial measurement segment, and the blood viscosity in the above equation, the total peripheral resistance can be determined by substituting L, $A_a$, and into the above equation (8), $$TPR = \frac{16.24\pi * bZ^2 * \exp(1.55 - 0.02T)}{p^2 L(b - Z)^2} \quad \#(9)$$

where TPR denotes total peripheral resistance, Z denotes impedance of the target measurement segment, b denotes calibration parameter, T denotes blood temperature, and ρ is blood density.

After determining the total peripheral resistance TPR, and the cardiac cycle t, the embodiment of this invention substitutes the TPR as well as t into the above equation (4) to obtain the diastolic blood pressure DBP of the target subject, and the highest and lowest points of the impedance waveform correspond to the two blood pressure levels under the same cardiac cycle. Since the impedance Z is inversely proportional to DBP through the cross-sectional area (A), $Z_{max}$ is used to estimate DBP, $$DBP = P_0 * \exp\left(-K_1 \frac{tL(b - Z_{max})^2 e^{0.02T}}{(bZ_{max})^2}\right) \quad \#(10)$$

where DBP is the diastolic pressure, is the end-systolic aortic pressure ($P_0$ is a constant), exp is an exponential function with e as a base, is a calibration parameter, is the maximum impedance value, t is the cardiac cycle, L is the length of the arterial segment, and T is the blood temperature.

The above equation (10) shows that the cardiac cycle t, the length of the target measurement segment L, the impedance maximum and the blood temperature T are unknown quantities, therefore, the diastolic pressure can be determined according to the cardiac cycle, the length of the target measurement segment, the impedance maximum and the blood temperature in this invention example, and the diastolic pressure determined by the cardiac cycle, the length of the target measurement segment, the impedance maximum and the blood temperature is called the first diastolic pressure.

The pulsatile nature of the blood flow generates a pressure pulse wave that propagates from the heart down through the arterial wall with a certain velocity called pulse wave velocity (PWV). PWV is obtained from the time delay Δt, the PTT, between two loci in the arterial system (the starting and ending loci of the target measurement segment), and the distance the pulse wave travels, D. The pulse wave of this embodiment, the distance carried out is the length L of the target measurement segment, and then the relationship between L, PTT, and PWV can be expressed by equation (11), $$PWV = \frac{L}{PTT} \quad \#(11)$$

where L denotes the conduction distance (the distance between the start and end positions of the target measurement segment), PWV is the pulse wave velocity, and PTT is the conduction time with the pulse wave.

In some scenarios, the time interval between the R-wave of the ECG signal of the same cardiac cycle and the characteristic point of the peripheral PWV signal, such as the peak point of the PPG signal, is usually applied as a measure of PTT in blood pressure estimation. Several authors have shown that the PTT may reflect only the high-frequency component due to its dominance in pulse pressure; in other words, the PTT is more responsive to changes in pulse pressure. Therefore, estimating pulse pressure calculations by using PTT may be a way to improve the accuracy of estimating continuous blood pressure information without a cuff.

The Moens-Korteweg (M-K) equation provides a quantitative assessment of PWV by the following expression, which also reflects the relationship between pulse wave velocity PWV and modulus of elasticity E, see equation (12).

$$PWV = \sqrt{\frac{Eh}{\rho d}} \quad \#(12)$$

where PWV is the pulse wave velocity, E is the elastic modulus, p is the blood density and is a constant, h is the thickness of the arterial wall, and d is the diameter of the artery.

From equations (11) and (12) above, equation (13) can be determined, $$PWV = \frac{D}{PTT} = \sqrt{\frac{Eh}{\rho d}} \quad \#(13)$$

In the M-K equation, the modulus of elasticity E is given by the following equation (14)

$$E = \frac{\Delta P}{\Delta R_o} \frac{2(1 - \sigma^2) R_0 R_i^2}{R_0^2 - R_i^2} \quad \#(14)$$

where $R_o$ is the extravascular radius of the artery, $\Delta R_o$ denotes the value of the change in the extravascular radius of the artery, the change of $\Delta R_o$ with the change in $\Delta P$ is the pulse pressure of the target subject to be measured, $R_i$ denotes the intravascular radius of the artery, σ is the Poisson's ratio.

Assuming that the wall thickness h remains constant, the radius of the artery R in this study is, according to equation (6)(13)(14), PP is related to PTT and ΔR as expressed in equation (15), $$PP \propto \frac{\Delta R}{PTT^2} \propto \frac{\Delta Z}{PTT^2} \quad \#(15)$$

That is, the pulse pressure PP is proportional to $\Delta R/PTT^2$ and the pulse pressure PP is proportional to $\Delta R/PTT^2$, from which equation (16) can be obtained as follows:

$$PP = K_2 * \frac{\Delta Z}{PTT^2} \quad \#(16)$$

where PP denotes pulse pressure, $K_2$ is a calibration parameter and is a constant, ΔZ is the first difference corresponding to the degree of variation of impedance. In order to determine pulse pressure PP, the first difference corresponding to the degree of variation of impedance also needs to be determined.

The first difference value corresponding to the degree of change of impedance in this embodiment is the difference between the maximum value of impedance and the minimum value of impedance during the cardiac cycle.

After determining the first difference value ΔZ corresponding to the degree of change of impedance and PTT, the pulse pressure of the target object is obtained by substituting ΔZ and PTT into the above equation (10).

In the above formula (10), the first difference value ΔZ corresponding to the degree of change of impedance and the PTT are unknown quantities, therefore, the embodiment can determine the pulse pressure of the target object based on the first difference value and the conduction time of the pulse wave.

When measuring the blood pressure of the target object, in addition to diastolic pressure, the pulse pressure and systolic pressure of the target object are also measured, and the systolic pressure is the sum of the pulse pressure and diastolic pressure, so the present embodiment can use the sum of the first diastolic pressure and the first pulse pressure as the first systolic pressure of the target object.

That is, after determining the first diastolic pressure DBP and the first pulse pressure PP, the sum of the first diastolic pressure DBP and the first pulse pressure PP is taken as the first systolic pressure SBP.

The first systolic pressure can be determined by equation (17), $$SBP = PP + DBP = P_0 * \exp\left(-K_1 \frac{tL(b-Z_{max})^2 e^{0.02T}}{(bZ_{max})^2}\right) + K_2 * \frac{\Delta Z}{PTT^2} \quad \#(17)$$

where, DBP is the first diastolic pressure, PP is the first pulse pressure, SBP is the first systolic pressure, exp is the exponential function with base e, t is the cardiac cycle, L is the length of the target measurement segment, $Z_{max}$ is the maximum impedance value, T is the blood temperature, PTT is the pulse transit time, ΔZ is the first difference corresponding to the degree of change in impedance, $P_0$ is the end-systolic aortic pressure, $K_1$, $K_2$, b are the calibration parameters.

In the actual measurement of blood pressure, continuous blood pressure presents the change in blood pressure of the target subject over a period of time, and continuous blood pressure can bring more research significance.

The present embodiment presents the first diastolic blood pressure, the first pulse pressure and the first systolic blood pressure at respective time in a time axis to obtain a continuous first diastolic blood pressure, a continuous first pulse pressure and a continuous first systolic blood pressure respectively.

A possible implementation is provided in this invention to determine the first diastolic blood pressure of the target subject according to the cardiac cycle, the length of the target measurement segment, the maximum impedance value and the blood temperature comprises: substituting the cardiac cycle, the length of the target measurement segment, the maximum impedance value and the blood temperature into a first target formula to obtain the first diastolic blood pressure of the target subject; the first target formula being:

$$DBP = P_0 * \exp(-K_1 \frac{tL(b-Z_{max})^2 e^{0.02T}}{(bZ_{max})^2})$$

wherein, DBP is the first diastolic blood pressure, exp is an exponential function with base e, t is the cardiac cycle, L is the length of the target measurement segment, $Z_{max}$ is the maximum impedance value, T is the blood temperature, $P_0$ is an end-systolic aortic pressure, $P_0$ is a constant, $K_1$ and b are calibration parameters, $K_1$ and b are constants.

The above-mentioned first target formula is the derived formula (10), and the present embodiment does not go into too much detail here, and the first diastolic pressure of the target object can be obtained directly by substituting the cardiac cycle, the length of the target measurement segment, the maximum impedance, and the blood temperature into the first target formula.

A possible implementation is provided in this invention to determine the first pulse pressure of the target subject according to the first difference and the PTT comprises: substituting the first difference and the PTT into a second target formula to obtain the first pulse pressure of the target subject; the second target formula being:

$$PP = K_2 * \frac{\Delta Z}{PTT^2}$$

wherein PP is the first pulse pressure, $K_2$ is a calibration parameter, $K_2$ is a constant, PTT is the pulse transit time, ΔZ is the first difference.

As described in the preceding embodiment, the second target formula of the present embodiment is the aforementioned formula (16), and the present embodiment will not be repeated here, and the first difference value as well as the PTT can be directly substituted into the second target formula to obtain the first pulse pressure of the target object.

A possible implementation is provided in this embodiment, wherein the physiological information comprises a second blood pressure information; the second blood pressure information comprises a second diastolic blood pressure, a second pulse pressure and a second systolic blood pressure; the step of determining the continuous physiological information of the target subject according to the target continuous multi-modal physiological signals comprises: at any time, determining a ratio of a vessel diameter to a vessel thickness of the target arterial segment according to the target ultrasound signal; determining a second systolic blood pressure and a second diastolic blood pressure of the target subject according to the PTT and the ratio respectively; taking difference between the second systolic blood pressure and the second diastolic pressure as the second pulse pressure of the target subject; presenting the second systolic blood pressure, the second pulse pressure and the second diastolic blood pressure at respective time in a time axis to obtain a continuous second systolic blood pressure, a continuous second pulse pressure and a continuous second diastolic blood pressure respectively.

In the aforementioned embodiment, the first diastolic pressure, the first pulse pressure, and the first systolic pressure are determined by four target physiological signals, and the blood pressure information of the target object can be determined by the same three target physiological signals in this embodiment, and the blood pressure information determined by the three target physiological signals is called the second blood pressure information; the second blood pressure information includes the second diastolic pressure, the second pulse pressure, and the second systolic pressure.

According to Hughes equation, the modulus of elasticity E is exponentially related to the pressure P (18), $$E=E_0 * e^{\gamma P} \# \quad (18)$$

$E_0$ is the zero-pressure modulus, y is a constant, usually between 0.016 and 0.018, and in conjunction with $$PWV = \frac{D}{PTT} = \sqrt{\frac{Eh}{\rho d}}, P = \frac{1}{\gamma}\left(2\ln PWV + \ln\frac{\rho D}{hE_0}\right)$$

can be obtained. The ratio r of vessel diameter to thickness is obtained by ultrasound, and the blood pressure estimation equation are:

$$SBP = K_3 \ln(r/PTT^2) + a \# \qquad (19)$$

$$DBP = K_4 \ln(r/PTT^2) + b \# \qquad (20)$$

where SBP is the second systolic blood pressure, DBP is the second diastolic blood pressure, r is the ratio of vessel diameter to vessel thickness in the target arterial segment, PTT is the pulse transit time, ln is a logarithmic function with base e, $K_3$, $K_4$, a and c are calibration parameters, and $K_3$, $K_4$, a and c are constants.

By generating a highly directional ultrasound beam that provides a penetration depth of 4 cm, which is sufficient to penetrate any vessel with a depth of up to 3 cm, such as the radial, brachial and carotid arteries, the ultrasound signal can obtain information on blood flow and vessel walls. Due to the thin beam width, which is smaller than the size of the above-mentioned arteries, the target vessel can be selectively penetrated without disturbing the neighboring vessels, accurately reflecting information such as vessel diameter and blood flow rate. The dense distribution of piezoresistive elements can provide high-resolution signals for vasodilatation calculations and can provide good signals to obtain accurate information on vessel wall dilation such as vessel diameter, reflecting the mechanism of the vessel wall. In addition, using the Doppler effect of ultrasound signals, the blood flow velocity information can be obtained computationally based on the variation relationship between its original transmitting and receiving frequencies to establish a link with blood pressure information.

In the above equation (19) and equation (20), the ratio of vessel diameter to vessel thickness of the target arterial segment r and PTT are unknown quantities, therefore, the systolic and diastolic pressures of the target object can be determined by the embodiment of this invention based on the ratio of vessel diameter to vessel thickness of the target arterial segment and PTT, and the embodiment of this invention refers to the ratio of vessel diameter to vessel thickness of the target arterial segment and the PTT as systolic and diastolic pressures determined by the ratio of vessel diameter to vessel thickness and PTT in the target arterial segment are referred to as the second systolic and second diastolic pressures.

The second systolic pressure and the difference between the second diastolic pressure as the second pulse pressure of the target subject.

The second systolic pressure, the second pulse pressure, and the second diastolic pressure at each moment are presented in a time axis to obtain a continuous second systolic pressure, a continuous second pulse pressure, and a continuous second diastolic pressure, respectively.

A possible implementation is provided in this embodiment to determine the second systolic blood pressure and the second diastolic blood pressure of the target subject according to the PTT and the ratio respectively comprises: substituting the PTT and the ratio into a third target formula and a fourth target formula respectively to obtain the second systolic blood pressure and the second diastolic blood pressure; the third target formula being:

$$SBP = K_3 \ln(r/PTT^2) + a$$

wherein, SBP is the systolic blood pressure, r is the ratio of the vessel diameter to the vessel thickness of the target arterial segment, ln is the logarithmic function with base e, PTT is the pulse transit time; $K_3$ and a are calibration parameters, $K_3$ and a are constants; the fourth target formula being:

$$DBP = K_4 \ln(r/PTT^2) + c$$

wherein, DBP is the diastolic blood pressure, r is the ratio of the vessel diameter to the vessel thickness of the target arterial segment, ln is the logarithmic function with base e, PTT is the pulse conduction time, $K_4$ and c are calibration parameters, $K_4$ and c are constant.

As described in the preceding embodiment, the third target formula of this embodiment is the aforementioned formula (19) and the fourth target formula is the aforementioned formula (20), and this embodiment will not be elaborated too much here, and the ratio of vessel diameter to vessel thickness and PTT of the target arterial segment can be directly substituted into the aforementioned third target formula and the aforementioned fourth target formula to obtain the second systolic pressure of the target object and second diastolic pressure of the target subject.

A possible implementation is provided in this embodiment to determine the continuous physiological information of the target subject according to the continuous target multi-modal physiological signals comprises: determining a mean value of the first diastolic blood pressure and the second diastolic blood pressure at the same time, using the mean value of the first diastolic blood pressure and the second diastolic blood pressure as a target diastolic blood pressure; determining a mean value of the first pulse pressure and the second pulse pressure at the same time, using the mean value of the first pulse pressure and the second pulse pressure as a target pulse pressure; determining a mean value of the first systolic blood pressure and the second systolic blood pressure at the same time, using the mean value of the first systolic blood pressure and the second systolic blood pressure as a target systolic blood pressure; presenting the target diastolic blood pressure, the target pulse pressure and the target systolic blood pressure at respective time in a time axis to obtain a continuous target diastolic blood pressure, a continuous target pulse pressure and a continuous target systolic blood pressure respectively.

The methods of the present embodiment for calculating the blood pressure of the target subject are diverse, and the average value of the first diastolic pressure and the second diastolic pressure at the same moment can be used as the target diastolic pressure, the average value of the first systolic pressure and the second systolic pressure at the same moment as the target systolic pressure, and the average value of the first systolic pressure and the second systolic pressure at the same moment as the target systolic pressure.

Of course, the diastolic pressure shown for the target object in this embodiment may be any one or more of the above-mentioned first diastolic pressure, second diastolic pressure or target diastolic pressure, and this embodiment is not limited to this, and the same is true for the pulse pressure or systolic pressure.

One possible implementation is provided in this embodiment, after obtaining the continuous target diastolic blood pressure, the continuous target pulse pressure and the continuous target systolic blood pressure, the step further comprising: determining a body position change of the target subject by the accelerometer signal, calibrating the continuous target diastolic blood pressure, continuous target pulse pressure and the continuous target systolic blood pressure according to the body position change; determining a change value of pressure applied to blood pressure measurement parts of the target subject according to the target pressure signal, calibrating the continuous target diastolic blood pressure, continuous target pulse pressure and the continuous target systolic blood pressure according to the change value of the pressure.

The embodiment of this invention automatically calibrates these blood pressures after determining the pulse pressure, systolic pressure, and diastolic pressure, and this embodiment provides a variety of calibration methods, including, self-calibration by causing changes in blood hydrostatic pressure by using accelerometers to monitor changes in body position; self-calibration by loading applied pressure to bring the transmural pressure close to zero, and self-calibration by using pressure sensors to monitor external pressure; the function of cuffless and non-perturbative calibration of blood pressure changes generated by human physiological conditions and external environmental influences can also be achieved through big data analysis.

A possible implementation is provided in this embodiment, wherein after the step of determining the continuous physiological information of the target subject according to the continuous target multi-modal physiological signals, the step further comprising: if a value corresponding to the continuous physiological information exceeds a corresponding pre-set threshold or pre-set threshold range, at least one of conducting a local alarm call or sending an alarm information to an emergency contact person or an ambulance center.

For example, the normal range of systolic blood pressure in blood pressure: 90 to 139 mmHg, the preset threshold range of systolic blood pressure can be set to 90 to 139 mmHg, and when the value of the systolic blood pressure of the target subject does not lie in this preset threshold range, a local call for help or an alarm message is sent.

Figure 5:
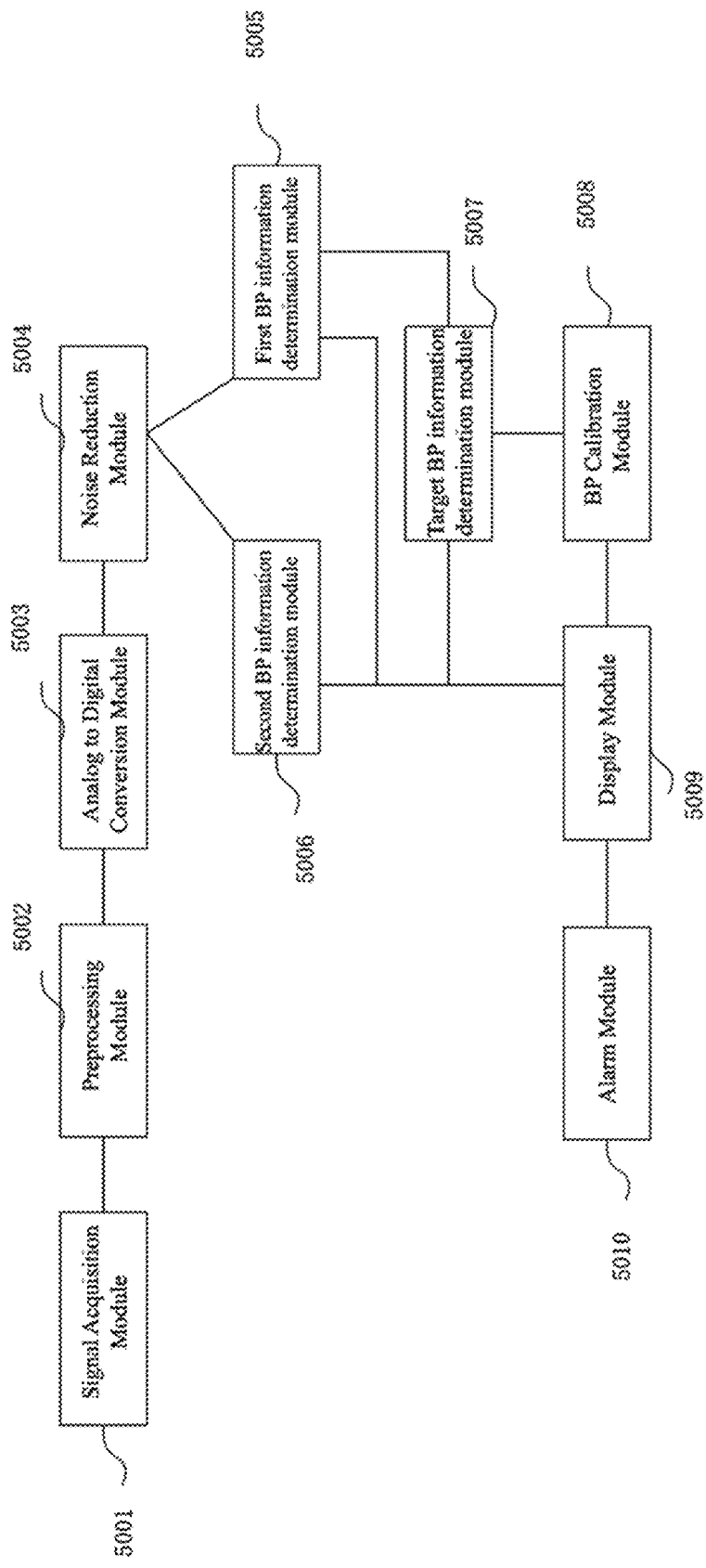
FIG. 5 shows a schematic diagram of the interaction of a blood pressure measurement method provided by embodiments of the present invention.

As shown in FIG. 5, which exemplarily illustrates a schematic structure of the blood pressure measurement method provided by embodiments of the present invention, including a signal acquisition module 5001, a preprocessing module 5002, an analog-to-digital conversion module 5003, a noise reduction module 5004, a first BP information determination module 5005, a second BP information determination module 5006, a target BP information determination module 5007, a BP calibration module 5008, a display module 5009, and an alarm module 5010, the signal acquisition module 5001 for acquiring raw signals, the raw signals including raw multi-modal physiological signals as well as accelerometer signals, the raw multi-modal physiological signals including: raw temperature signal, raw IPG signal, raw ECG signal, raw PPG signal, raw pressure signal, and original ultrasound signal of at least three original physiological signals; accelerometer signal includes reference frequency noise signal and reference motion noise signal; preprocessing module 5002 for pre-processing the above original signal for amplification, original filtering, etc., to obtain the pre-processed multi-modal physiological signals; multiplexing the pre-processed multi-modal physiological signals to obtain the multiplexed multi-modal physiological signals; analog-to-digital conversion module 5003, for converting the acquired analog signal into a digital signal, the analog signal refers to the above-mentioned target multi-modal physiological signals; noise reduction module 5004, for adaptive filtering processing of the multiplexed multi-modal physiological signals according to the reference PLI and the reference motion noise signal, and performing time division processing of the filtered multi-modal physiological signals to obtain the target multi-modal The first BP information determination module 5005 is used to determine the first blood pressure information of the target object based on the target temperature signal, the target IPG signal, the target ECG signal, and the target PPG signal, the first blood pressure information including the continuous first diastolic blood pressure, the continuous first pulse pressure, and the continuous first systolic blood pressure; the second BP information determination module 5006 is used to determine the first blood pressure information of the target object based on the target ultrasound signal, the target ECG signal, and the target PPG signal. second blood pressure information, the second blood pressure information includes continuous second diastolic blood pressure, continuous second pulse pressure, and continuous second systolic blood pressure; the target BP information determination module 5007 is used to determine the average value of the first diastolic blood pressure and the second diastolic blood pressure at the same moment, using the average value of the first diastolic blood pressure and the second diastolic blood pressure as the target diastolic blood pressure; determine the average value of the first diastolic blood pressure and the second diastolic blood pressure at the same determine the mean values of the first pulse pressure and the second pulse pressure at the same moment, and use the mean values of the first pulse pressure and the second pulse pressure as the target pulse pressure; determine the mean values of the first systolic pressure and the second systolic pressure at the same moment, and use the mean values of the first systolic pressure and the second systolic pressure as the target systolic pressure; present the target diastolic pressure, the target pulse pressure, and the target systolic pressure at each moment in the time axis, and obtain the continuous target diastolic pressure, the continuous target The BP calibration module 5008 is used to determine the change in body position of the target subject by the accelerometer signal, and calibrate the continuous target diastolic pressure, continuous target pulse pressure, and continuous target systolic pressure according to the change in body position; determine the change in pressure applied to the blood pressure measurement site of the target subject by the target pressure signal, and calibrate the continuous target diastolic pressure, continuous target pulse pressure, and continuous target systolic pressure according to the change in pressure. diastolic pressure, continuous target pulse pressure, and continuous target systolic pressure; a display module 5009 for displaying at least one of estimated first blood pressure information or second blood pressure information or target blood pressure information on a screen of a cell phone, computer, or wearable device; an alarm module 5010 for displaying at least one of estimated first pulse pressure (or second pulse pressure or target pulse pressure), first diastolic pressure (or second diastolic pressure or target (or second diastolic pressure or target diastolic pressure) or any of the first systolic pressure (or second systolic pressure or target systolic pressure) exceeds the corresponding predetermined threshold, then at least one of a local alarm call or sending an alarm message to an emergency contact or ambulance center is performed.

The above specific implementation is consistent with the previous embodiments, and the present embodiment will not be repeated here.

Figure 6:
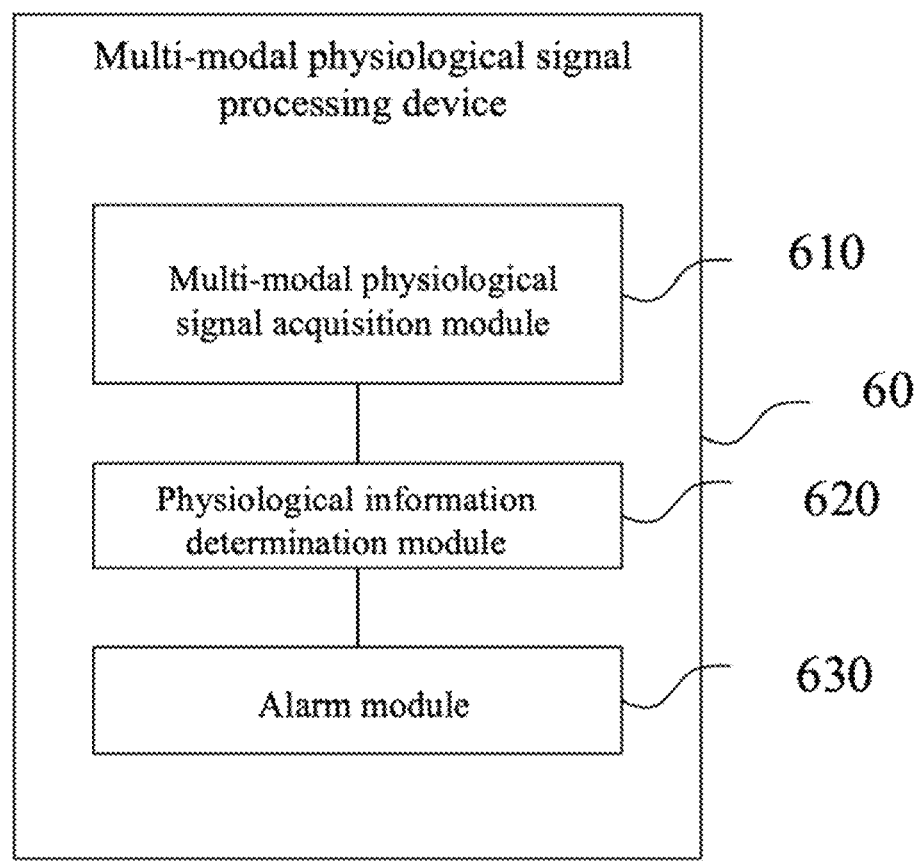
FIG. 6 shows a schematic diagram of the structure of a processing device for multi-modal physiological signals provided by embodiments of the present invention.

The present embodiment provides a multi-modal physiological signal processing device 60 as shown in FIG. 6, which may include, a multi-modal physiological signal acquisition module 610 for acquiring continuous target multi-modal physiological signals, the target multi-modal physiological signals including at least three target physiological signals of the target temperature signal, the target IPG signal, the target ECG signal, the target PPG signal, the target pressure signal, and the target ultrasound signal.

A physiological information determination module 620 for determining continuous physiological information of the target object based on the continuous target multi-modal physiological signals.

Embodiments of the present invention by acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal and a target ultrasound signal; determining a continuous physiological information of a target subject, especially a continuous blood pressure information, according to the continuous target multi-modal physiological signals. The present invention determines the continuous physiological information by acquiring the continuous multi-modal physiological signals, so that the physiological information acquired is more accurate, and is more beneficial to the timely detection of abnormal physiological information, so that patients can be treated in time.

Embodiments of the present invention provide a possible implementation in which the multi-modal physiological signals acquisition module further comprises, original multi-modal physiological signals acquisition sub-module for acquiring a continuous, original multi-modal physiological signals, the original multi-modal physiological signals comprises at least three original physiological signals of an original temperature signal, an original IPG signal, an original ECG signal, an original PPG signal, an original pressure signal and an original ultrasound signal; the original multi-modal physiological signals comprises a motion noise signal and PLI; a time division multiplexing (TDM) sub-module for at any time of the original multi-modal physiological signals, performing a time division multiplexing (TDM) process on the original multi-modal physiological signals to obtain a multiplexed multi-modal physiological signals; a reference noise signal acquisition sub-module for acquiring an accelerometer signal; the accelerometer signal includes a reference frequency PLI and a reference motion noise signal.

Target multi-modal physiological signals determination sub-module, for performing an adaptive filtering process on the multiplexed multi-modal physiological signals according to the reference PLI and the reference motion noise signal, performing a time division process on a filtered multi-modal physiological signals to obtain a target multi-modal physiological signals.

Embodiments of the present invention provide a possible implementation in which the physiological information includes first blood pressure information; the first blood pressure information includes first diastolic blood pressure, first pulse pressure, and first systolic blood pressure; the physiological information determination module includes, a data acquisition submodule for determining, for any moment, a blood temperature of the target subject based on a target temperature signal; a maximum impedance value of the target measurement segment based on a target IPG signal; a cardiac cycle of the target subject based on a target ECG signal; a first difference value corresponding to a change in impedance of the target subject during the cardiac cycle based on the target ECG signal as well as the target IPG signal; a first difference value corresponding to a change in impedance of the target subject based on the target cardiac determining the PTT required for the pulse wave to pass through the target measurement segment based on the target ECG signal and the target PPG signal; determining the length of the target measurement segment based on the target IPG signal; the target measurement segment comprising the target arterial segment and the tissue surrounding the target arterial segment; and a first diastolic pressure determination sub-module for determining a first diastolic pressure of the target subject based on the cardiac cycle, the length of the target measurement segment, the impedance maximum, and the blood temperature a first pulse pressure determination submodule for determining the first pulse pressure of the target subject based on the first difference value and the PTT; a first systolic pressure determination sub-module for determining the sum of the first diastolic pressure as well as the first pulse pressure as the first systolic pressure of the target subject; a continuous first blood pressure information obtaining module for presenting the first systolic pressure, the first pulse pressure, and the first diastolic pressure at each moment in a time axis to obtain the continuous first systolic pressure, the continuous first pulse pressure, and the continuous first diastolic pressure, respectively.

The present embodiment provides a possible implementation wherein the first diastolic pressure determination sub-module is specifically used to obtain the first diastolic pressure of the target subject by substituting the cardiac cycle, the length of the target measurement segment, the maximum impedance, and the blood temperature into the first target formula. The first objective formula is, $$DBP = P_0 * \exp(-K_1 \frac{tL(b - Z_{max})^2 e^{0.02T}}{(bZ_{max})^2})$$

wherein, DBP is the first diastolic blood pressure, exp is an exponential function with base e, t is the cardiac cycle, L is the length of the target measurement segment, $Z_{max}$ is the maximum impedance value, T is the blood temperature, $P_0$ is an end-systolic aortic pressure, $P_0$ is a constant, $K_1$ and b are calibration parameters, $K_1$ and b are constants.

The present embodiment provides a possible implementation where the first pulse pressure determination sub-module is specifically used to obtain the first pulse pressure of the target object by substituting the first difference value as well as the PTT into a second target formula. The second target equation is, $$PP = K_2 * \frac{\Delta Z}{PTT^2}$$

wherein PP is the first pulse pressure, $K_2$ is a calibration parameter, $K_2$ is a constant, PTT is the pulse transit time, $\Delta Z$ is the first difference.

Embodiments of the present invention provide a possible way of implementing, wherein the physiological information comprises a second blood pressure information; the second blood pressure information comprises a second diastolic blood pressure, a second pulse pressure and a second systolic blood pressure; the step of determining the continuous physiological information of the target subject according to the target continuous multi-modal physiological signals comprises: at any time, determining a ratio of a vessel diameter to a vessel thickness of the target arterial segment according to the target ultrasound signal; determining a second systolic blood pressure and a second diastolic blood pressure of the target subject according to the PTT and the ratio respectively; taking difference between the second systolic blood pressure and the second diastolic pressure as the second pulse pressure of the target subject; presenting the second systolic blood pressure, the second pulse pressure and the second diastolic blood pressure at respective time in a time axis to obtain a continuous second systolic blood pressure, a continuous second pulse pressure and a continuous second diastolic blood pressure respectively.

Embodiments of the present invention provide a possible way of implementing, wherein the step of determining the second systolic blood pressure and the second diastolic blood pressure of the target subject according to the PTT and the ratio respectively comprises: substituting the PTT and the ratio into a third target formula and a fourth target formula respectively to obtain the second systolic blood pressure and the second diastolic blood pressure; the third target formula being:

$$SBP = K_3 \ln(r/PTT^2) + a$$

wherein, SBP is the systolic blood pressure, r is the ratio of the vessel diameter to the vessel thickness of the target arterial segment, ln is the logarithmic function with base e, PTT is the pulse transit time; $K_3$ and a are calibration parameters, $K_3$ and a are constants; the fourth target formula being:

$$DBP = K_4 \ln(r/PTT^2) + c$$

wherein, DBP is the diastolic blood pressure, r is the ratio of the vessel diameter to the vessel thickness of the target arterial segment, ln is the logarithmic function with base e, PTT is the pulse conduction time, $K_4$ and c are calibration parameters, $K_4$ and c are constant.

Embodiments of the present invention provide a possible way of implementing, wherein the step of determining the continuous physiological information of the target subject according to the continuous target multi-modal physiological signals comprises: determining a mean value of the first diastolic blood pressure and the second diastolic blood pressure at the same time, using the mean value of the first diastolic blood pressure and the second diastolic blood pressure as a target diastolic blood pressure; determining a mean value of the first pulse pressure and the second pulse pressure at the same time, using the mean value of the first pulse pressure and the second pulse pressure as a target pulse pressure; determining a mean value of the first systolic blood pressure and the second systolic blood pressure at the same time, using the mean value of the first systolic blood pressure and the second systolic blood pressure as a target systolic blood pressure; presenting the target diastolic blood pressure, the target pulse pressure and the target systolic blood pressure at respective time in a time axis to obtain a continuous target diastolic blood pressure, a continuous target pulse pressure and a continuous target systolic blood pressure respectively.

Embodiments of the present invention provide a possible way of implementing, wherein after obtaining the continuous target diastolic blood pressure, the continuous target pulse pressure and the continuous target systolic blood pressure, the step further comprising: determining a body position change of the target subject by the accelerometer signal, calibrating the continuous target diastolic blood pressure, continuous target pulse pressure and the continuous target systolic blood pressure according to the body position change; determining a change value of pressure applied to blood pressure measurement parts of the target subject according to the target pressure signal, calibrating the continuous target diastolic blood pressure, continuous target pulse pressure and the continuous target systolic blood pressure according to the change value of the pressure.

Embodiments of the present invention provide a possible way of implementing, wherein after the step of determining the continuous physiological information of the target subject according to the continuous target multi-modal physiological signals, the step further comprising: if a value corresponding to the continuous physiological information exceeds a corresponding pre-set threshold or pre-set threshold range, at least one of conducting a local alarm call or sending an alarm information to an emergency contact person or an ambulance center.

Embodiments of the present invention provide a possible implementation, the apparatus further comprising, a first calibration module for determining, by means of an accelerometer signal, a change in the body position of the target subject, calibrating the continuous target diastolic pressure, the continuous target pulse pressure, and the continuous target systolic pressure based on the change in body position; a second calibration module for determining, by a target pressure signal, a change in the value of the pressure applied for the blood pressure measurement site of the target subject, calibrating the continuous target diastolic pressure, the continuous target pulse pressure, and the continuous target systolic pressure based on the change in the value of the pressure.

A possible implementation is provided in this embodiment, wherein the apparatus further comprises, an alarm module for performing a local alarm call for help or sending an alarm message to at least one of an emergency contact or an ambulance center if the value of continuous physiological information exceeds a corresponding predetermined threshold.

The apparatus of the present embodiment can perform the method provided in the present embodiment, and its implementation principle is similar. The actions performed by the modules in the apparatus of the present embodiment are corresponding to the steps in the method of the present embodiment, and the detailed functional description of the modules of the apparatus can be specifically referred to the description in the corresponding method shown in the previous section, which will not be repeated here.

The present embodiment provides an electronic apparatus comprising a memory, a processor and a computer program stored on the memory, the processor executing the above-mentioned computer program to implement the steps of the blood pressure measurement method, which can be achieved in comparison with related technology: the present embodiment achieves this by acquiring continuous target multi-modal physiological signals, the target multi-modal physiological signals comprise at least three target physiological signals of a target temperature signal, a target IPG signal, a target ECG signal, a target PPG signal and a target ultrasound signal; determining a continuous physiological information of a target subject, especially a continuous blood pressure information, according to the continuous target multi-modal physiological signals. The present invention determines the continuous physiological information by acquiring the continuous multi-modal physiological signals, so that the physiological information acquired is more accurate, and is more beneficial to the timely detection of abnormal physiological information, so that patients can be treated in time.

Figure 7:
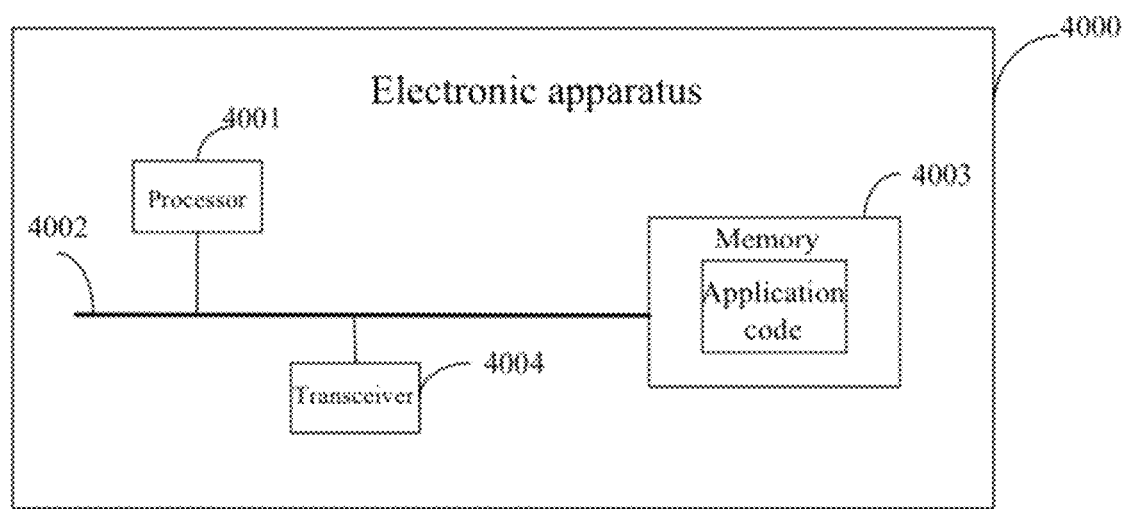
FIG. 7 shows a schematic diagram of the structure of an electronic device provided by embodiments of the present invention.

In an optional embodiment an electronic apparatus is provided, as shown in FIG. 7, wherein the electronic apparatus 4000 shown in FIG. 7 includes: a processor 4001 and a memory 4003. Wherein the processor 4001 and the memory 4003 are connected, e.g., via a bus 4002. Optionally, the electronic device 4000 may also include a transceiver 4004, which may be used for data interaction between this electronic device and other electronic devices, such as the sending of data and/or the receiving of data, etc. It should be noted that the transceiver 4004 is not limited to one in practical applications, and the structure of the electronic device 4000 does not constitute a limitation of this embodiment.

The processor 4001 may be a CPU (Central Processing Unit), a general-purpose processor, a DSP (Digital Signal Processor), an ASIC (Application Specific Integrated Circuit), an FPGA (Field Programmable Gate Array), or other programmable logic device, transistorized logic device, hardware component, or any combination thereof. It may implement or execute various exemplary logic boxes, modules, and circuits described in conjunction with the disclosure of this invention. Processor 4001 may also be a combination that implements a computing function, such as a combination containing one or more microprocessors, a combination of a DSP and a microprocessor, etc.

The bus 4002 may include a pathway to transfer information between the above components. Bus 4002 may be a PCI (Peripheral Component Interconnect) bus or an EISA (Extended Industry Standard Architecture) bus, for example. Bus 4002 can be divided into address bus, data bus, control bus, etc. For the convenience of representation, only one thick line is used in FIG. 7, but it does not mean that there is only one bus or one type of bus.

Memory 4003 can be ROM (Read Only Memory) or other types of static storage devices that can store static information and instructions, RAM (Random Access Memory) or other types of dynamic storage devices that can store information and instructions, or EEPROM (Electrically Erasable Programmable Read Only Memory), CD-ROM (Compact Disc Read Only Memory) or other optical disc storage, optical disc storage (including compressed disc, laser disc, optical disc, digital universal CD-ROM (Compact Disc Read Only Memory, CD-ROM) or other optical disc storage, optical disc storage (including compact disc, laser disc, optical disc, digital universal disc, Blu-ray disc, etc.), disk storage media, other magnetic storage devices, or any other media capable of being used to carry or store computer programs and capable of being read by a computer, without limitation herein.

Memory 4003 is used to store a computer program for executing an embodiment of the present invention and is controlled for execution by processor 4001. The processor 4001 is used to execute the computer program stored in the memory 4003 to implement the steps shown in the preceding method embodiment.

Among others, the electronic device package may include, but is not limited to, mobile terminals such as cell phones, laptop computers, digital broadcast receivers, PDAs (personal digital assistants), PADs (tablet computers), PMPs (portable multimedia players), vehicle terminals (e.g., vehicle navigation terminals), and the like, and fixed terminals such as digital TVs, desktop computers, and so on. The electronic device shown in FIG. 7 is only an example and shall not impose any limitation on the functionality and scope of use of embodiments of the present disclosure.

Embodiments of the present invention provide a computer-readable storage medium on which a computer program is stored, and the computer program, when executed by a processor, implements the steps and corresponding contents of the foregoing method embodiments. Compared to the prior art it is possible to achieve: acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal and a target ultrasound signal; determining a continuous physiological information of a target subject, especially a continuous blood pressure information, according to the continuous target multi-modal physiological signals. The present invention determines the continuous physiological information by acquiring the continuous multi-modal physiological signals, so that the physiological information acquired is more accurate, and is more beneficial to the timely detection of abnormal physiological information, so that patients can be treated in time.

It should be noted that the computer readable medium described above in the present disclosure may be a computer readable signal medium or a computer readable medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above. magnetic memory devices, or any suitable combination of the foregoing. In the present disclosure, a computer-readable storage medium may be any tangible medium that contains or stores a program that may be used by or in combination with an instruction execution system or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than a computer-readable storage medium, the computer-readable signal medium can send, propagate or transmit a program for use by or in combination with an instruction execution system, device or device. The program code contained on the computer readable medium may be transmitted using any suitable medium, including but not limited to wire, fiber optic cable, RF (radio frequency), and the like, or any suitable combination of the foregoing.

Embodiments of the present invention also provide a computer program product comprising a computer program, the computer program when executed by a processor can implement the steps and corresponding contents of the foregoing method embodiments. Compared to the prior art it is possible to achieve: acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal and a target ultrasound signal; determining a continuous physiological information of a target subject, especially a continuous blood pressure information, according to the continuous target multi-modal physiological signals. The present invention determines the continuous physiological information by acquiring the continuous multi-modal physiological signals, so that the physiological information acquired is more accurate, and is more beneficial to the timely detection of abnormal physiological information, so that patients can be treated in time.

The terms "first", "second", "third", "fourth", "1", "2", etc. (if present) in the specification and claims of this invention and the accompanying drawings above are used to distinguish similar objects and need not be used to describe a particular order or sequence. It should be understood that the data so used is interchangeable where appropriate so that embodiments of the present invention described herein can be implemented in an order other than that illustrated or described in the text.

It should be understood that while the flow diagrams of embodiments of the present invention indicate the individual operational steps by arrows, the order in which these steps are performed is not limited to the order indicated by the arrows. Unless explicitly stated herein, in some implementation scenarios of embodiments of the present invention, the implementation steps in the respective flowcharts may be performed in other orders as desired. In addition, some or all of the steps in each flowchart may include multiple sub-steps or multiple stages based on actual implementation scenarios. Some or all of these sub-steps or phases may be executed at the same moment, and each of these sub-steps or phases may also be executed separately at different moments. In the scenario where the execution time is different, the execution order of these sub-steps or stages can be flexibly configured according to the demand, and this embodiment is not limited to this.

It should be noted that for a person of ordinary skill in the art, other similar means of implementation based on the technical idea of the present invention, without departing from the technical idea of the present invention, also fall within the scope of protection of the embodiments of the present invention.

We claim:

1. A method of processing multi-modal physiological signals, comprising:
   acquiring continuous target multi-modal physiological signals, the target multi-modal physiological signals comprise at least three target physiological signals of a target temperature signal, a target impedance plethysmogram (IPG) signal, a target electrocardiogram (ECG) signal, a target photoplethysmogram (PPG) signal, a target pressure signal and a target ultrasound signal;
   determining a continuous physiological information of a target subject according to the continuous target multi-modal physiological signals;
   wherein the target multi-modal physiological signals comprise at least the target temperature signal, the target IPG signal, the target ECG signal, and the target PPG signal, and the physiological information comprises a first blood pressure information; the first blood pressure information comprises a first diastolic blood pressure, a first pulse pressure and a first systolic blood pressure; wherein the step of determining the continuous physiological information of the target subject according to the target continuous multi-modal physiological signals comprises:
   at any time, determining a blood temperature of the target subject according to the target temperature signal; determining a maximum impedance value of a target measurement segment according to the target IPG signal; determining a cardiac cycle of the target subject according to the target ECG signal; determining a first difference corresponding to a change in the impedance of the target subject during the cardiac cycle according to the target ECG signal and the target IPG signal; determining a pulse transit time (PTT) required for a pulse wave to pass through the target measurement segment according to the target ECG signal and the target PPG signal; determining a length of the target measurement segment according to the target IPG signal; the target measurement segment comprises a target arterial segment and tissues surrounding the target arterial segment;
   determining the first diastolic blood pressure of the target subject according to the cardiac cycle, the length of the target measurement segment, the maximum impedance value and the blood temperature;
   determining the first pulse pressure of the target subject according to the first difference and the PTT;
   taking a sum of the first diastolic blood pressure and the first pulse pressure as the first systolic blood pressure of the target subject;
   presenting the first diastolic blood pressure, the first pulse pressure and the first systolic blood pressure at respective time in a time axis to obtain a continuous first diastolic blood pressure, a continuous first pulse pressure and a continuous first systolic blood pressure respectively.

2. The method according to claim 1, wherein the step of acquiring continuous target multi-modal physiological signals comprises:
   acquiring a continuous, original multi-modal physiological signals, the original multi-modal physiological signals comprise at least three original physiological signals of an original temperature signal, an original IPG signal, an original ECG signal, an original PPG signal, an original pressure signal and an original ultrasound signal; the original multi-modal physiological signals comprise a motion noise signal and powerline interference (PLI);
   at any time of the original multi-modal physiological signals, performing a time division multiplexing (TDM) process on the original multi-modal physiological signals to obtain a multiplexed multi-modal physiological signal;
   acquiring an accelerometer signal; the accelerometer signal comprises a reference PLI and a reference motion noise signal;
   performing an adaptive filtering process on the multiplexed multi-modal physiological signals according to the reference PLI and the reference motion noise signal, performing a time division process on a filtered multi-modal physiological signal to obtain the target multi-modal physiological signals.

3. The method according to claim 1, wherein the step of determining the first diastolic blood pressure of the target subject according to the cardiac cycle, the length of the target measurement segment, the maximum impedance value and the blood temperature comprises:
   substituting the cardiac cycle, the length of the target measurement segment, the maximum impedance value and the blood temperature into a first target formula to obtain the first diastolic blood pressure of the target subject; the first target formula being:

$$DBP = P_0 * \exp(-K_1 \frac{tL(b - Z_{max})^2 e^{0.02T}}{(bZ_{max})^2})$$

wherein, DBP is the first diastolic blood pressure, exp is an exponential function with base e, t is the cardiac cycle, L is the length of the target measurement segment, $Z_{max}$ is the maximum impedance value, T is the blood temperature, $P_0$ is an end-systolic aortic pressure, $P_0$ is a constant, $K_1$ and b are calibration parameters, $K_1$ and b are constants.

4. The method according to claim 1, wherein the step of determining the first pulse pressure of the target subject according to the first difference and the PTT comprises: substituting the first difference and the PTT into a second target formula to obtain the first pulse pressure of the target subject; the second target formula being:

$$PP = K_2 * \frac{\Delta Z}{PTT^2}$$

wherein PP is the first pulse pressure, $K_2$ is a calibration parameter, $K_2$ is a constant, PTT is the pulse transit time, $\Delta Z$ is the first difference.

5. The method according to claim 1, wherein the target multi-modal physiological signals further comprise at least the target ultrasound signal, and the physiological information comprises a second blood pressure information; the second blood pressure information comprises a second diastolic blood pressure, a second pulse pressure and a second systolic blood pressure; wherein the step of determining the continuous physiological information of the target subject according to the target continuous multi-modal physiological signals comprises:
   at any time, determining a ratio of a vessel diameter to a vessel thickness of the target arterial segment according to the target ultrasound signal;
   determining a second systolic blood pressure and a second diastolic blood pressure of the target subject according to the PTT and the ratio respectively;
   taking a difference between the second systolic blood pressure and the second diastolic pressure as the second pulse pressure of the target subject;
   presenting the second systolic blood pressure, the second pulse pressure and the second diastolic blood pressure at respective time in a time axis to obtain a continuous second systolic blood pressure, a continuous second pulse pressure and a continuous second diastolic blood pressure respectively.

6. The method according to claim 5, wherein the step of determining the second systolic blood pressure and the second diastolic blood pressure of the target subject according to the PTT and the ratio respectively comprises:
   substituting the PTT and the ratio into a third target formula and a fourth target formula respectively to obtain the second systolic blood pressure and the second diastolic blood pressure; the third target formula being:

SBP=$K_3$ ln(r/PTT$^2$)+a wherein, SBP is the systolic blood pressure, r is the ratio of the vessel diameter to the vessel thickness of the target arterial segment, ln is the logarithmic function with base e, PTT is the pulse transit time; $K_3$ and a are calibration parameters ⊠ $K_3$ and a are constants; the fourth target formula being:

DBP=$K_4$ ln(r/PTT$^2$)+c wherein, DBP is the diastolic blood pressure ⊠ r is the ratio of the vessel diameter to the vessel thickness of the target arterial segment ⊠ ln is the logarithmic function with base e ⊠ PTT is the pulse conduction time ⊠ $K_4$ and c are calibration parameters ⊠ $K_4$ and c are constant.

7. The method according to claim 5, wherein the step of determining the continuous physiological information of the target subject according to the continuous target multi-modal physiological signals comprises:
   determining a mean value of the first diastolic blood pressure and the second diastolic blood pressure at the same time, using the mean value of the first diastolic blood pressure and the second diastolic blood pressure as a target diastolic blood pressure;
   determining a mean value of the first pulse pressure and the second pulse pressure at the same time, using the mean value of the first pulse pressure and the second pulse pressure as a target pulse pressure;
   determining a mean value of the first systolic blood pressure and the second systolic blood pressure at the same time, using the mean value of the first systolic blood pressure and the second systolic blood pressure as a target systolic blood pressure;
   presenting the target diastolic blood pressure, the target pulse pressure and the target systolic blood pressure at respective time in a time axis to obtain a continuous target diastolic blood pressure, a continuous target pulse pressure and a continuous target systolic blood pressure respectively.

8. The method according to claim 7, wherein, after obtaining the continuous target diastolic blood pressure, the continuous target pulse pressure and the continuous target systolic blood pressure, the method further comprises:
   determining a body position change of the target subject by the accelerometer signal, calibrating the continuous target diastolic blood pressure, continuous target pulse pressure and the continuous target systolic blood pressure according to the body position change; and
   determining a change value of pressure applied to blood pressure measurement parts of the target subject according to the target pressure signal, calibrating the continuous target diastolic blood pressure, continuous target pulse pressure and the continuous target systolic blood pressure according to the change value of the pressure.

9. The method according to claim 1, wherein, after the step of determining the continuous physiological information of the target subject according to the continuous target multi-modal physiological signals, the method further comprises:
   if a value corresponding to the continuous physiological information exceeds a corresponding pre-set threshold or pre-set threshold range, at least one of conducting a local alarm call or sending an alarm information to an emergency contact person or an ambulance center.

10. An apparatus for processing multi-modal physiological signals, comprising:
   a multi-modal physiological signals acquiring module for acquiring continuous target multi-modal physiological signals, the target multi-modal physiological signals comprise at least three target multi-modal physiological signals of a target temperature signal, a target IPG signal, a target ECG signal, a target PPG signal, a target pressure signal and a target ultrasound signal;
   a physiological information determining module for determining a continuous physiological information of a target subject according to the continuous target multi-modal physiological signals;

wherein the target multi-modal physiological signals comprise at least the target temperature signal, the target IPG signal, the target ECG signal, and the target PPG signal, and the physiological information comprises a first blood pressure information; the first blood pressure information comprises a first diastolic blood pressure, a first pulse pressure and a first systolic blood pressure; wherein the step of determining the continuous physiological information of the target subject according to the target continuous multi-modal physiological signals comprises:

at any time, determining a blood temperature of the target subject according to the target temperature signal; determining a maximum impedance value of a target measurement segment according to the target IPG signal; determining a cardiac cycle of the target subject according to the target ECG signal; determining a first difference corresponding to a change in the impedance of the target subject during the cardiac cycle according to the target ECG signal and the target IPG signal; determining a pulse transit time (PTT) required for a pulse wave to pass through the target measurement segment according to the target ECG signal and the target PPG signal; determining a length of the target measurement segment according to the target IPG signal; the target measurement segment comprises a target arterial segment and tissues surrounding the target arterial segment;

determining the first diastolic blood pressure of the target subject according to the cardiac cycle, the length of the target measurement segment, the maximum impedance value and the blood temperature;

determining the first pulse pressure of the target subject according to the first difference and the PTT;

taking a sum of the first diastolic blood pressure and the first pulse pressure as the first systolic blood pressure of the target subject;

presenting the first diastolic blood pressure, the first pulse pressure and the first systolic blood pressure at respective time in a time axis to obtain a continuous first diastolic blood pressure, a continuous first pulse pressure and a continuous first systolic blood pressure respectively.

11. An electronic apparatus, comprising a memory, a processor and a computer program stored in the memory, wherein the processor executes the computer program to implement the method steps of claim 1.

* * * * *